United States Patent
Davidson

(10) Patent No.: US 6,748,696 B1
(45) Date of Patent: Jun. 15, 2004

(54) SELF-AUTOMATED MUSHROOM GROWING SYSTEM

(76) Inventor: Tony F. Davidson, 254 County Rd. 954, Mountain Home, AR (US) 72653

( * ) Notice: Subject to any disclaimer, the term of this patent is extended or adjusted under 35 U.S.C. 154(b) by 0 days.

(21) Appl. No.: 10/208,107

(22) Filed: Jul. 30, 2002

(51) Int. Cl.$^7$ ................................................. A01G 1/04
(52) U.S. Cl. .......................... 47/1.1; 47/69; 435/283.1; 435/254.1
(58) Field of Search ................... 47/1.1, 69; 435/283.1, 435/254.1

(56) References Cited

U.S. PATENT DOCUMENTS

| | | | |
|---|---|---|---|
| 1,773,648 A | * 8/1930 | Steves | |
| 3,242,614 A | 3/1966 | Thompson | |
| 3,810,327 A | * 5/1974 | Giansantes | 47/1.1 |
| 4,291,494 A | * 9/1981 | Knablein et al. | 47/17 |
| 4,315,381 A | * 2/1982 | Dvorin | 47/59 |
| 4,543,744 A | * 10/1985 | Royster | 47/17 |
| 4,646,465 A | * 3/1987 | Fujimoto | 47/1.1 |
| 4,722,159 A | 2/1988 | Wantanabe et al. | |
| 4,852,297 A | 8/1989 | Moren | |
| 4,979,332 A | * 12/1990 | Nagaya et al. | 47/69 |
| 5,924,238 A | * 7/1999 | Yamohara | 47/1.01 |

FOREIGN PATENT DOCUMENTS

JP 04229664 * 8/1992 ............ A01G/1/04

OTHER PUBLICATIONS

Soul Food Machine, 7 pages, from Jun. 22, 2000, Jul. 7, 2000, May 10, 2000, Jan. 10, 2000, Jan. 11, 2001; www.mushroommagic.com [retrived from www.waybackmachine.org on Jan. 13, 2003].*
"Soul Food Machine," mushroommagic.com, 2002, MAGIC, Prospect Heights, IL 2 pg.

* cited by examiner

Primary Examiner—Peter M. Poon
Assistant Examiner—Andrea M. Valenti
(74) Attorney, Agent, or Firm—Clock Tower Law Group; Erik J. Heels; Joshua D. Mather

(57) ABSTRACT

A self-automated mushroom growing apparatus and method for providing a continuous water and air supply for growing mushrooms on a small-scale. The apparatus is an enclosed, terrarium-like Grow Space including a porous Wicking Medium substrate, and an Air Diffuser rod situated within or below the porous Wicking Medium. An Air Diffuser is situated within the apparatus and is connected to an air supply to provide fresh air to the Grow Space. The porous Wicking Medium is saturated with water. The saturated Wicking Medium provides a continuous supply of water to a Cake Culture in contact with the Wicking Medium. The Air Supply mixes stale air that settles near the surface of the porous Wicking Medium.

18 Claims, 2 Drawing Sheets

SELF-AUTOMATED MUSHROOM GROWING SYSTEM

BACKGROUND OF THE INVENTION

1. Field of the Invention

This invention pertains generally to fungus cultivation and, specifically, to small-scale mushroom cultivation. Even more specifically, this invention pertains to devices and methods for growing mushrooms from cake cultures.

2. Description of Prior Art

Mushroom cultivation using cake cultures is popular among small-scale mushroom growers and in large-scale commercial applications. A cake culture is a stand-alone nutrient substrate composed of a nutrient source and, if needed, a structural ingredient. The substrate encourages the growth of the desired mushroom, and the proper environment discourages the invasion of undesirable bacteria and fungi. A cake culture may be of any size and shape. The nutrient source may be flour, grain, straw, sawdust, wood chips, coffee grounds, or mushroom-compatible composts. A mushroom colonizes the cake culture during the vegetation phase of the mushroom lifecycle. During the reproductive phase of the mushroom lifecycle, fruiting bodies grow either directly from the cake culture, or from the cake culture through casing media. Initiating the reproductive phase using a cake culture is known as birthing the culture.

The environment surrounding the cake culture substantially affects the quality of the fruiting bodies. Several elements are important for a quality crop. An environment with a proper balance of moisture, ventilation, humidity, temperature, and light will encourage mushroom growth, while minor changes to the environment adversely affect the temperamental fungus.

An ample source of water is necessary because mushrooms are approximately 90% water by weight. Disrupting the water supply can result in stunted, disproportioned, or aborted fruit bodies. After a cake culture has been birthed, the chief cause of contamination is exposure to high carbon dioxide levels. Constant ventilation is necessary because mushrooms produce carbon dioxide, and excessive carbon dioxide results in stale air in the grow space. If the carbon dioxide is not vented or mixed with fresh air, then the carbon dioxide, which is heavier than the other gases in the air, will accumulate at the bottom of the grow space around the cake culture and cause growth to be slowed and/or the fruit bodies to be twisted, distorted, or stunted. A low or high humidity level will adversely affect mushrooms in a similar manner.

Traditionally, it has been difficult to reproduce the ideal mushroom environment for the small-scale or indoor grower. Commercial growers find ideal mushroom growing conditions by either growing in caves and mines or by constructing expensive facilities to produce a suitable mushroom climate. These approaches are neither practical nor economical for the small-scale grower.

A common practice for the small-scale grower is to birth a cake culture in a terrarium. Terrariums provide an enclosed environment that helps maintain humidity. A typical terrarium generally requires daily maintenance. Hand fanning is required several times daily to mix the carbon dioxide with a fresh supply of air. Spray misting is also required several times daily to supply and maintain proper humidity. Watering is also needed daily to prevent a cake culture from exhausting its water supply. Thus, the cake culture requires frequent maintenance. It is desirable to have a system that reduces the required maintenance of the cake cultures.

Efforts to solve these problems include a number of patents.

U.S. Pat. No. 3,242,614 (Thompson, Mar. 29, 1966) discloses a mushroom growing container. The growing container includes a bottom portion to hold spawn media and a layer of casing media. A cylindrical, invertible top portion has notched sidewalls and encloses the grow space. Although the notched edges aid in ventilation, they do not provide an active air mixing system. Additionally, Thompson's device contains no means for a continuous water source.

U.S. Pat. No. 4,722,159 (Wantanabe et al., Feb. 2, 1988) discloses a method of cultivation of mushrooms that requires frequent misting to maintain proper hydration and humidity.

U.S. Pat. No. 4,852,297 (Moren, Aug. 1, 1989) discloses a self-contained mushroom producing vessel intended primarily as an ornamental or decorative mushroom growing device. A nutrient substrate completely fills the vessel. The vessel is wrapped in fabric and rests in a water reservoir. After holes are punched in the vessel, fruit bodies grow through the holes into a room environment while the fabric cover wicks moisture to the holes in the vessel. Only a few species of mushrooms, however, are hearty enough to grow in this manner without a controlled climate.

None of the prior art discusses a self-automated mushroom growing system. What is needed, therefore, is a mushroom growing apparatus for use with a cake culture that 1) continuously supplies moisture to a cake culture, 2) automatically mixes fresh air into the growing environment, and 3) maintains proper humidity in the growing environment.

BRIEF SUMMARY OF THE INVENTION

The present invention is directed to a self-automated mushroom growing apparatus to provide ideal growing conditions for cultivating mushrooms from cake cultures. A Base Tray holds a Wicking Medium to which water is added. The Wicking Medium continuously supplies water to a Cake Culture resting thereon. A Lid rests on the Base Tray and defines a Grow Space to house one or more Cake Cultures and the accompanying fruiting bodies such as mushrooms. An Air Diffuser is situated within the apparatus and connects to an air supply to provide fresh air to the Grow Space. The fresh air passes through the Wicking Medium and mixes with the settling stale air within the Grow Space.

Objects

Cake Culture Hydration

One object of the invention is to provide a mushroom growing apparatus and method that provides moisture to mushroom Cake Cultures to prevent the Cake Cultures from drying and to permit the Cake Cultures to support multiple mushroom flushes.

Air Circulation

Another object of the invention is to provide an apparatus and method for preventing carbon dioxide build-up by supplying fresh air to the Grow Space that meets and mixes with settling carbon dioxide to provide the desired rate of fresh air exchange required by a given mushroom species.

Humidity Control

Another object of the invention is to provide an apparatus and method for adjusting the humidity level to tailor the moisture conditions to specific mushroom varieties and to the different stages of the mushroom lifecycle.

Features

Cake Culture Hydration

One feature of the invention is a Wicking Medium that provides a continuous water supply to Cake Cultures. The Wicking Medium may be a layer of clay pebbles or other any other hydroponics medium such as perlite. After submerging a portion of the Wicking Medium, the partially submerged Wicking Medium continuously wicks moisture to Cake Cultures positioned on the surface of the Wicking Medium. The Wicking Medium can supply moisture to multiple Cake Cultures for approximately two weeks.

Air Circulation

Another feature of the invention is an air entrainment system that mixes fresh air with the carbon dioxide that a mushroom produces. An Air Diffuser within the Grow Space is connected to an air supply. The fresh air passes through the Wicking Medium and mixes with the settling stale air.

Humidity Control

The combination of the water supply and the air supply helps maintain the proper humidity in the Grow Space. A Lid encloses the Grow Space, protects the growing environment from airborne contaminants and also prevents humidity loss. When the Lid is transparent, a user can more easily monitor progress of a mushroom flush.

Additional Features

For mushrooms needing a warmer environment, a heater may be positioned outside of the apparatus, within the Wicking Medium, or within the Grow Space to maintain a desired temperature for a given mushroom species. An adjustable Exhaust Valve allows the proper amount of air to be released from the Grow Space for a given mushroom species.

Advantages

There are many advantages to the invention, including the following. Other advantages, applications, and variations of the invention will be apparent to those skilled in the art. For example, although the apparatus and method were developed primarily for growing mushrooms, it is apparent to those skilled in the art that the apparatus and method can be used for any application wherein microbes or tissues are grown in a controlled environment.

Cake Culture Hydration

Cake Culture hydration is provided by way of a Wicking Medium that is a porous substrate. Placing the Cake Culture directly onto a saturated substrate, such as water-soaked clay pebbles, allows the Cake Culture to draw the water needed to feed the mushroom crops with a continuous supply of water. The moisture wicked to the cake cultures prevents the Cake Culture from drying up and shrinking. Mushrooms reach full maturity without depleting the Cake Culture of moisture. This enables the Cake Culture to be reused for multiple mushroom flushes.

Air Circulation

Air entrainment is generated by situating the Air Diffuser, for example, below the clay pebble medium, which causes the fresh air to rise up into the Grow Space from the bottom of the Grow Space where the stale air typically tends to settle, since carbon dioxide is heavier than the other gases in the air. Excess carbon dioxide is the main contributor to contaminations breeding within the Grow Space, since such contaminants thrive and breed in small pockets of high carbon dioxide or stale air. This entrainment system substantially inhibits the heavier stale air from settling down onto the bottom surfaces of the Grow Space by meeting it just above the Wicking Medium (clay pebble medium) surface and diffusing it back into the Grow Space where it can be better metabolized by the mushroom crop. This is similar to a commercial mixing box used in larger growing applications since it mixes the fresh and stale air together to create a balance that is ideal for the crop's existence. Mixing in fresh air serves a dual purpose in that it helps to prevent contamination and also simulates a mixing box type of effect.

Humidity Control

The Cake Culture and mushroom crop are highly dependant on the moisture surrounding it within the Grow Space. This moisture is commonly referred to as rh (relative humidity). It is ideal for the Cake Culture to remain in an environment that provides a constant exposure to a high humidity; otherwise the cropping surface of the Cake Culture may become too dry resulting in a severely damaged flush or Cake Culture. When the Cake Cultures are first birthed in the Grow Space, they require the highest rh setting. Once primordia have formed, the rh value can be lowered to better suit the progression of growth from primordia into fruit bodies. Pins are tiny underdeveloped mushrooms that are commonly considered to be the beginning of the primordia formation phase. After pins have matured into adolescent fruit bodies, the rh value should be lowered yet again to better accommodate the maturing fruit bodies. The rh is controlled by the combination of the water supply, air supply, and the adjustable Exhaust Valve. The adjustable Exhaust Valve allows the proper amount of air to be released from the Grow Space for a given mushroom species. Controlling the rh in this manner eliminates the need for daily misting.

Other Advantages

Another advantage of the invention is to substantially reduce the time a mushroom grower needs to commit for a successful crop, especially the time needed for hand fanning and hand misting of mushroom fruit bodies.

Another advantage is that the mushroom growth is self-automated or semi-automated. The Wicking Media supplies water to Cake Cultures for up to two weeks, thereby eliminating the need for daily watering. Additionally, the Air Diffuser supplies fresh air, thereby eliminating the need for daily hand fanning. Other advantages include an increased crop number and larger fruit body size, quicker colonization time, and eliminating the need for a casing layer for the Cake Cultures.

DETAILED DESCRIPTION OF THE INVENTION, INCLUDING THE PREFERRED EMBODIMENT

Figure 1:
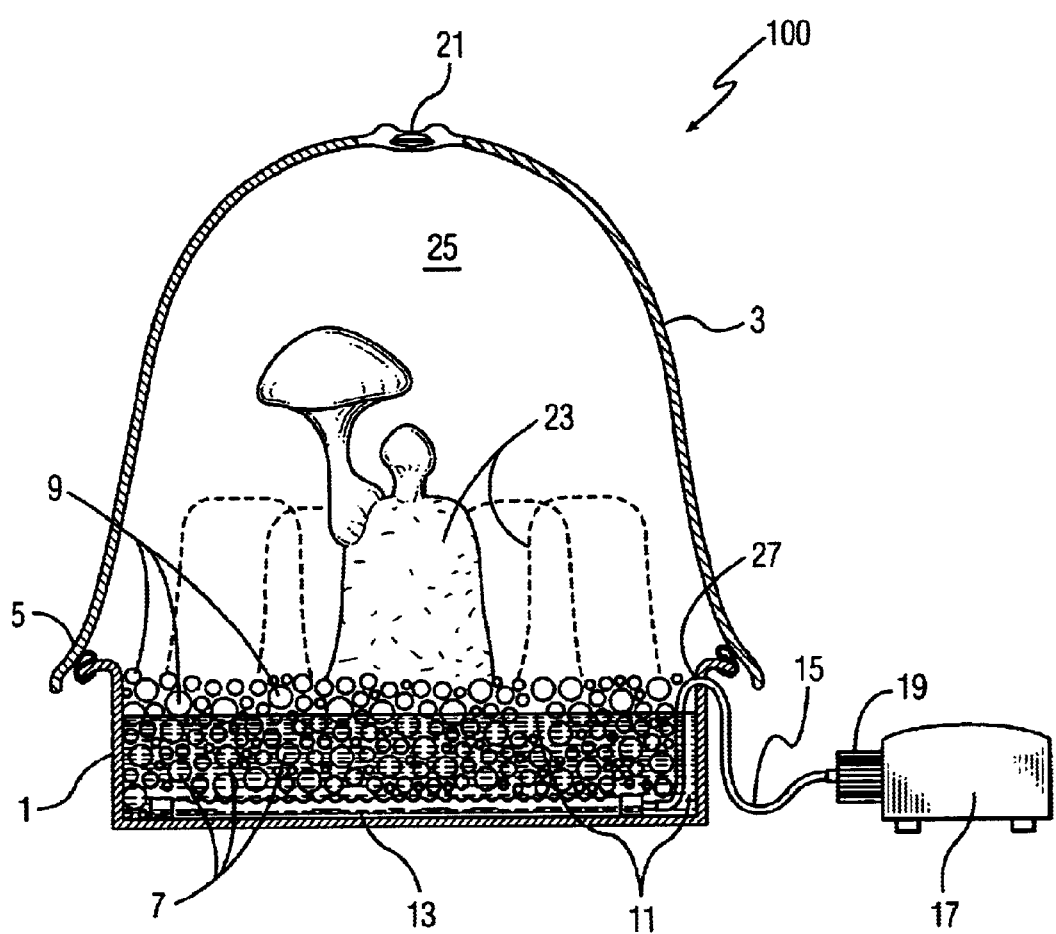
FIG. 1 is a front view of the apparatus.
Figure 2:
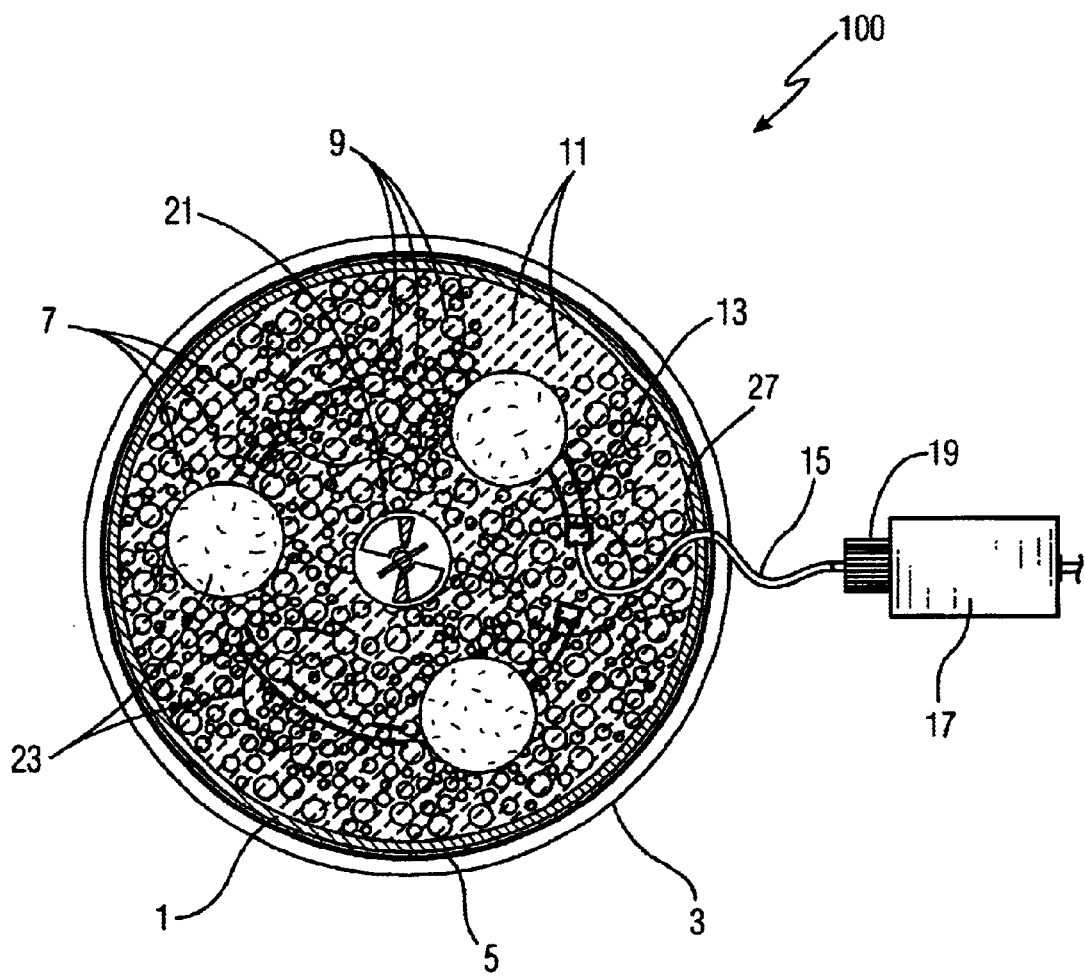
FIG. 2 is a top view of the apparatus.

With reference to FIG. 1, the self-automated mushroom growing Apparatus 100 of the present invention comprises a circular Base Tray 1 that includes a Rubber Trim 5. The Rubber Trim 5 creates a seal for Grow Space 25 when Lid 3 rests on Base Tray 1. Lid 3 is made of transparent plastic and includes variable Exhaust Valve 21 located at the top of Lid 3.

Base Tray 1 is filled with Submerged Wicking Media 7 and Exposed Wicking Media 9, which are made of expanded porous clay pebbles such as GEOLITE. Cake Culture 23 rests on top of Exposed Wicking Media 9. Flexible Air Diffuser Rod 13 is positioned in Base Tray 1 underneath Submerged Wicking Media 7. Airline Hose 15 attaches to Air Diffuser Rod 13 and passes through Aperture 27 on Base Tray 1. Airline Hose 15 connects to Air Pump 17, which includes an Adjustable Rheostat 19.

Water 11 is added to Base Tray 1 so that the Submerged Wicking Media 7 is under the water and the Exposed Wicking Media 9 is above the water. After Water 11 is added to the clay pebbles 27, the Water 11 passes from the Submerged Wicking Media 7 through the Exposed Wicking Media 9 and to the Cake Culture 23 to prevent the Cake Culture 23 from drying out. Air Pump 17 supplies fresh air to Grow Space 25 by diffusing air through Air Diffuser Rod 13. The fresh air rises through the Submerged Wicking Media 7 and the Exposed Wicking Media 9 into Grow Space 25 to mix with stale air within Grow Space 25. Excess air is released through adjustable Exhaust Valve 21. p The preferred embodiment is described above. The invention, however, may be embodied in other specific forms without departing from the spirit or essential characteristics thereof. The present embodiments are therefore to be considered in all respects as illustrative and not restrictive, the scope of the invention being indicated by the claims rather than the foregoing description. All changes that come within the meaning and range of equivalency of the claims are therefore intended to be embraced therein. Other embodiments include the following.

In another embodiment, the Air Diffuser rod is replaced with a stone.

In another embodiment, the Air Diffuser is placed at the top of the Apparatus to pull or push air into the Grow Space.

In another embodiment, the Air Diffuser comprises built-in holes in the Base Tray. The built-in air holes are supplied with air from an air pump that hooks directly onto the outside of the Base Tray via an air hose and built-in fitting that is manufactured into the Base Tray.

In another embodiment, the Rubber Trim is replaced with plastic or another suitable material.

In another embodiment, the Base Tray and lid are combined into a single-piece Container having a Top Portion and a Bottom Portion and having an access opening for placing the Wicking Medium and Cake Cultures therein.

In another embodiment, a heater is positioned outside of the apparatus, within the Wicking Medium, or within the Grow Space to maintain a desired temperature for a given mushroom species.

I claim:

1. An apparatus for growing mushrooms from a cake culture, said apparatus comprising:
   a container having a lower segment and an upper segment defining a grow space;
   a wicking medium at least partially filling said lower segment;
   a cake culture positioned on said Wicking Medium; and
   an air diffuser positioned within said wicking medium below said surface of said wicking medium and connected to an air source, thereby supplying air into said grow space by diffusing air through said wicking medium.

2. The apparatus of claim 1 wherein said air diffuser is integral with said lower segment of said container, said wicking medium covering said air diffuser.

3. The apparatus of claim 1 wherein said air diffuser is selected from a group consisting of an air diffuser rod connected to an air supply and an air diffuser stone connected to an air supply.

4. The apparatus of claim 1 further comprising:
   an exhaust valve disposed on said container whereby air is vented from said grow space.

5. The apparatus of claim 4 wherein said air diffuser is selected from a group consisting of an air diffuser rod connected to an air supply and an air diffuser stone connected to an air supply.

6. The apparatus of claim 4 wherein said air diffuser is integral with said lower segment of said container, said wicking medium covering said air diffuser.

7. The apparatus of claim 1 wherein:
   said lower segment is a base tray having a top perimeter; and
   said upper segment is a lid, positionable on said top perimeter of said base tray, thereby substantially sealing said grow space.

8. The apparatus of claim 7 wherein said air diffuser is integral with said lower segment of said container, said wicking medium covering said air diffuser.

9. The apparatus of claim 7 wherein said air diffuser is selected from a group consisting of an air diffuser rod connected to an air supply and an air diffuser stone connected to an air supply.

10. The apparatus of claim 7 further comprising:
    an exhaust valve disposed on said container whereby air is vented from said grow space.

11. The apparatus of claim 10 wherein said air diffuser is integral with said lower segment of said container, said wicking medium covering said air diffuser.

12. The apparatus of claim 10 wherein said air diffuser is selected from a group consisting of an air diffuser rod connected to an air supply and an air diffuser stone connected to an air supply.

13. The apparatus of claim 10 further comprising:
    an aperture on said base tray; and
    an airline hose connecting said air diffuser to said air supply through said aperture.

14. The apparatus of claim 13 wherein said air diffuser is selected from a group consisting of an air diffuser rod connected to an air supply and an air diffuser stone connected to an air supply.

15. The apparatus of claim 13 wherein said air diffuser is integral with said lower segment of said container, said wicking medium covering said air diffuser.

16. A method for growing mushrooms from a cake culture, said method comprising the steps of:
    providing a container defining a grow space for said cake culture;
    providing a wicking medium positioned in a lower segment of said container;
    positioning a cake culture on said wicking medium;
    wicking moisture to said cake culture;
    supplying air into said grow space through an air diffuser positioned below said surface of said wicking medium; and
    controlling the relative humidity of said grow space by adjusting an exhaust valve disposed on said container, whereby air is vented from said grow space.

17. The method of claim 16 further comprising the steps of:
    submersing a portion of said wicking medium in water; and
    colonizing said cake culture.

18. An apparatus for growing mushrooms from a cake culture, said apparatus comprising:
    a cake culture for colonizing mushrooms;
    a container means having a grow space containing a cake culture positioned on a wicking medium;
    a wicking means wicking moisture to said cake culture;
    an air diffuser means supplying air into said grow space through said wicking medium; and
    a control means varying the amount of air transferred into and out of said grow space.

* * * * *